United States Patent [19]
Tsao

[11] 3,899,545
[45] Aug. 12, 1975

[54] RECOVERY OF HYDROGEN CHLORIDE IN AN ALKYLATION PROCESS

[75] Inventor: Utah Tsao, Jersey City, N.J.

[73] Assignee: The Lummus Company, Bloomfield, N.J.

[22] Filed: Dec. 12, 1973

[21] Appl. No.: 423,902

[52] U.S. Cl. .......... 260/671 R; 208/262; 260/671 P
[51] Int. Cl. .............................................. C07c 3/54
[58] Field of Search ...... 260/671 R, 671 P; 208/262

[56] References Cited
UNITED STATES PATENTS

| | | | |
|---|---|---|---|
| 2,395,022 | 2/1946 | Sutton et al. | 208/262 |
| 2,399,662 | 5/1946 | Burk et al. | 260/671 |
| 2,498,567 | 2/1950 | Morris et al. | 260/671 |
| 3,591,650 | 7/1971 | Mitsak | 260/671 |

*Primary Examiner*—Delbert E. Gantz
*Assistant Examiner*—C. E. Spresser
*Attorney, Agent, or Firm*—Marn & Jangarathis

[57] ABSTRACT

In the alkylation of an aromatic hydrocarbon, hydrogen chloride vented from the alkylation reactor or flashed from the alkylation product is recovered by direct contact with aromatic hydrocarbon to be used as feed. The aromatic hydrocarbon, containing absorbed hydrogen chloride, is introduced into the alkylation reactor.

6 Claims, 1 Drawing Figure

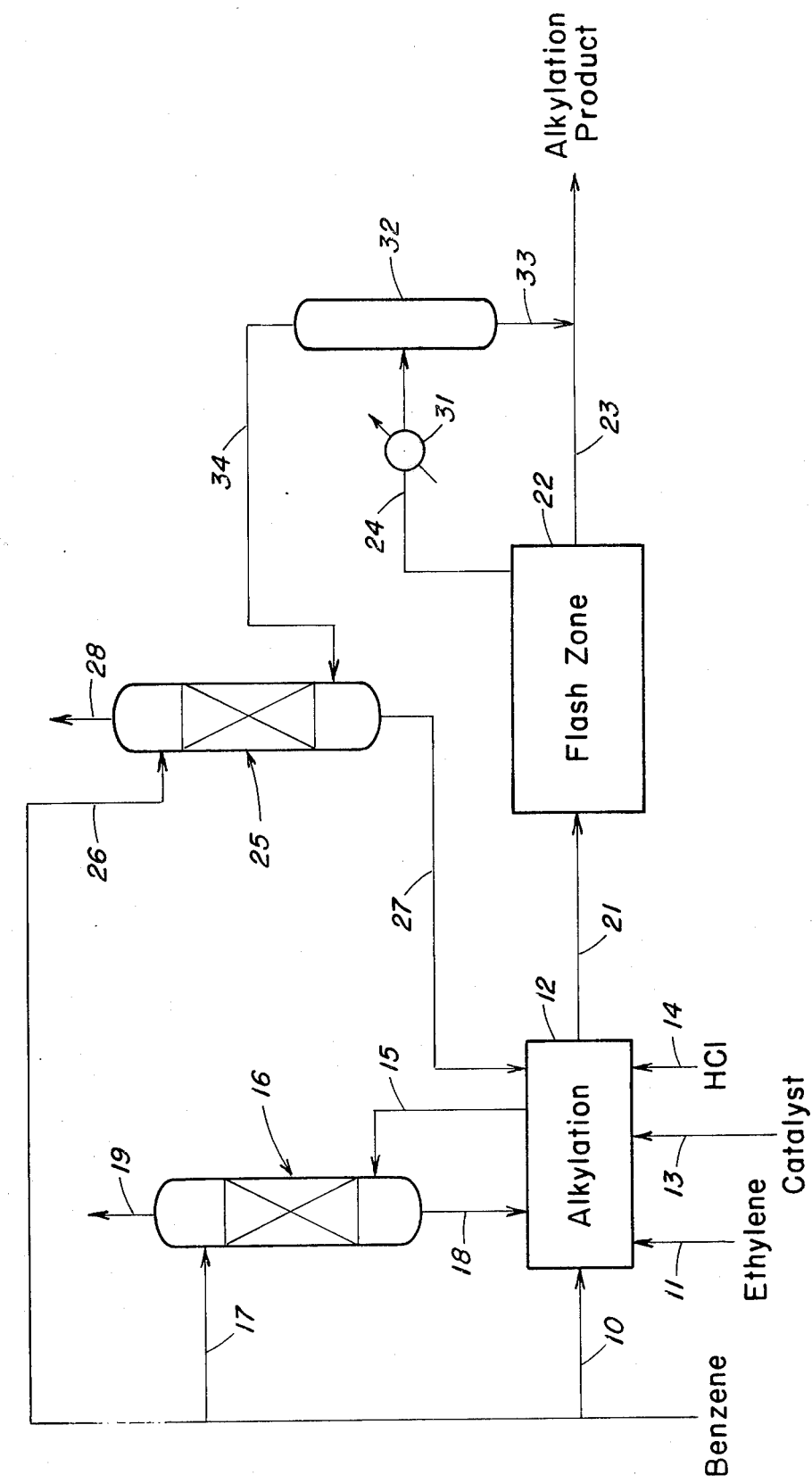

RECOVERY OF HYDROGEN CHLORIDE IN AN ALKYLATION PROCESS

This invention relates to the alkylation of aromatic hydrocarbons, and more particularly to a new and improved process for recovering hydrogen chloride in an alkylation process.

In the alkylation of aromatic hydrocarbons by use of an olefin, hydrogen chloride or a substance which releases hydrogen chloride is generally introduced into the alkylation reactor to promote the alkylation. As a result, the gas vented from the alkylation reactor includes hydrogen chloride and economics of the process can be improved by effectively recovering such hydrogen chloride.

U.S. Pat. No. 3,591,650 proposes a process for recovering hydrogen chloride from a gaseous effluent withdrawn from an alkylation reactor. In accordance with the teachings of the patent, vapor flashed from the alkylation product, containing benzene and hydrogen chloride is combined with the hydrogen chloride containing gaseous effluent and the combined stream introduced into a reflux condenser wherein benzene is condensed to absorb hydrogen chloride from the gas. The condensed benzene, containing absorbed hydrogen chloride, is recycled to the alkylation reactor.

The process described in U.S. Pat. No. 3,591,650, however, is limited in that the benzene which can be provided for hydrogen chloride recovery is limited by the temperature of the alkylation reactor. In addition, the flashed vapor which is condensed and recycled to the reactor contains alkylation product which reduces overall efficiencies.

Accordingly, the principle object of the present invention is to provide improved hydrogen chloride recovery in alkylation process.

In accordance with the present invention, the hydrogen chloride containing gas withdrawn from an alkylation reactor is contacted with aromatic hydrocarbon to be used as fresh feed in the alkylation, the absorb hydrogen chloride from the gas. The aromatic hydrocarbon, containing absorbed hydrogen chloride, is then introduced into the alkylation reactor.

In an alkylation process, the liquid alkylation effluent may also contain dissolved hydrogen chloride. In accordance with the present invention, hydrogen chloride is flashed from the effluent and directly contacted with aromatic hydrocarbon to be used as fresh feed to the alkylation process to absorb the hydrogen chloride. The aromatic hydrocarbon containing absorbed hydrogen chloride recovered from the gas flashed from the liquid product is introduced into the alkylation reactor.

The invention will be further described with respect to the accompanying drawing which is a simplified schematic flow diagram of an embodiment of the present invention.

The process will be particularly described with respect to the production of ethyl benzene by reaction between ethylene and benzene, but it is to be understood that the process of the invention is generally applicable to the production of alkylated aromatic hydrocarbons; e.g., the production of cumene by reaction of benzene and propylene.

Referring now to the drawing, a portion of fresh feed benzene in line 10 and fresh feed ethylene in line 11 are introduced into an alkylation reaction zone, schematically indicated as 12. The fresh feed ethylene is generally obtained from a refinery and, accordingly, generally also includes methane and/or ethane.

The alkylation zone 12 is also provided, through line 13, with a metal halide alkylation catalyst of a type known in the art, preferably aluminum chloride and through line 14, with an activator or catalyst promotor which is either hydrogen chloride or a substance which yields hydrogen chloride under alkylation conditions, such as ethyl chloride. The alkylation zone 12 may also be provided with an absorption medium for the ethylene, preferably a polyalkylbenzene, such as polyethylbenzene, to provide more intimate contact between ethylene and benzene.

The alkylation reaction zone is operated as known in the art and in view of the fact that such conditions form no part of the present invention a detailed explanation in this respect is not required for a full understanding of the invention. Thus, for example, with an aluminum chloride catalyst, the alkylation can be effected at a temperature from about 80° to 150°C., preferably 150° to 200°C. and a pressure from 5 to 250 psig., preferably from 80 to 120 psig.

A vent gas, containing hydrogen chloride and any components such as methane and/or ethane, introduced with the ethylene feed is withdrawn from the alkylation reaction zone 12 through line 15 and introduced into the bottom of a vent gas absorber 16. A portion of the benzene to be used as fresh feed, to the alkylation reaction, in liquid form, is introduced into the top of absorber 16 through line 17, and the descending benzene countercurrently contacts the ascending vent gas whereby the benzene selectively absorbs hydrogen chloride. In addition, the benzene is preheated by direct contact with the vent gas. The liquid benzene enriched in hydrogen chloride absorbed from the vent gas is withdrawn from the bottom of absorber 16 through line 18 and introduced into the alkylation zone 12.

The absorber 16 is generally operated at a bottoms temperature from about 20°C. to about 150°C. and a pressure from about 5 to about 250 psig. The benzene introduced through line 17 is generally at a temperature from about 10° to about 50°C.

The vent gas, now essentially free of hydrogen chloride is withdrawn from absorber 16 through line 19. In addition, the vent gas in line 19 may be scrubbed with polyethylbenzene to recover benzene therefrom with the polyethylbenzene, containing absorbed benzene being recycled to the alkylation zone 12. If there are any remaining amounts of hydrogen chloride in the gas withdrawn through line 19, alkali scrubbing may be required before release thereof to the atmosphere.

A liquid alkylation product, containing ethyl benzene, is withdrawn from the alkylation reaction zone 12 through line 21 and introduced into product flash zone, schematically indicated as 22. The flash zone 22 is employed to flash the liquid alkylation product, while hot, to reduce dissolved hydrogen chloride. In general, the flash zone 22 is operated at a temperature from about 120°C. to about 170°C and a pressure from about 10 psig. to about 50 psig.

A crude alkylation product is withdrawn from flash zone 22 through line 23 and passed to a product recovery zone (not shown) for recovery of ethyl benzene.

Flashed vapor, containing hydrogen chloride, benzene and alkyl benzene, is withdrawn from flash zone 22 through line 24 and cooled in condenser 31 to a temperature at which essentially all of the ethyl benzene and a major portion of the benzene are condensed, without any substantial absorption of hydrogen chloride in the condensate. In general, the condensation is effected at a temperature from about 107°C. to about 135°C. The cooled stream withdrawn from condenser 31 is introduced into a gas liquid separator 32 to separate the condensate therefrom. The condensate withdrawn from separator 32 through line 33 is combined with the alkylation product stream in line 23.

The vapor stream withdrawn from separator 32 through line 34 is introduced into the bottom of flash gas absorber 25.

A portion of the benzene to be used as fresh feed to the alkylation reactor, in liquid form, is introduced into the top of absorber 25 through line 26 with the descending benzene absorbing hydrogen chloride. In addition, any benzene and/or ethyl benzene in the flashed gas is absorbed into the liquid phase. Furthermore, the benzene is preheated by contact with the flashed gas. The liquid benzene enriched in hydrogen chloride absorbed from the flash gas, is withdrawn from the bottom of absorber 25 through line 27 and introduced into the alkylation zone 12.

The absorber 25 is generally operated at a bottoms temperature from about 20°C to about 100°C and a pressure from about 10 to about 50 psig. The benzene introduced through line 26 is generally at a temperature from about 10°C. to about 50°C.

In general, there is no net gas overhead flow from absorber 25. Any gas overhead may be withdrawn from absorber 25 through line 28. In addition, as hereinabove described with reference to absorber 16, the vent gas can be scrubbed with polyethylbenzene to recover any benzene therefrom and if required, the absorber 16 may be subjected to further scrubbing to remove any remaining hydrogen chloride prior to release to the atmosphere.

It is to be understood that depending on the requirements for absorbers 16, and 25, there may be no net benzene feed introduced through line 10 in that all of the benzene feed may be employed in the absorbers.

It is further to be understood, that in some cases; in particular, those in which there is only a small quantity of flashed gas in line 15, one of the absorbers could be eliminated and the gas in line 15 and 34 are introduced into a single absorber wherein hydrogen chloride is absorbed therefrom by direct contact with aromatic hydrocarbon feed.

The invention will be further described with respect to the following example, but the scope of the invention is not to be limited thereby. Unless otherwise indicated, all parts and percentages are by weight.

EXAMPLE 6000 lb./hr. of vent gas in line 15, containing 80 lb./hr. of hydrogen chloride is introduced into a 2 foot I.D. packed absorber 16 operated at a bottoms temperature of 290°F. and a pressure of 90 psig. 12,000 lbs./hr. of benzene at ambient temperature is introduced through line 17, and the hydrogen chloride recovery is 99%.

The vapor in line 24 comprised of 135 lbs./hr. of hydrogen chloride, 22,000 lbs./hr. benzene and 9,000 lbs./hr. of ethyl benzene is cooled in condenser 31 to 130°C. to condense 75% of the benzene and 95% of the ethyl benzene, with the condensate containing 13 lbs./hr. of hydrogen chloride. The vapor in line 34 containing 122 lbs/hr of hydrogen chloride is introduced into 3 foot I.D. packed absorber 25 operated at a pressure of 25 psig. and a bottoms temperature of 170°F. 40,000 lbs/hr of benzene at ambient temperature is introduced into absorber 25 through line 26 and over 99% of the hydrogen chloride is absorbed.

The present invention is particularly advantageous in that by effectively recovering hydrogen chloride there is a net savings of material requirements as well as a reduction in requirements for treating a waste hydrogen chloride stream. Furthermore, there is a utility savings resulting from the preheating of benzene feed in the hydrogen chloride recovery.

Numerous modifications and variations of the present invention are possible in light of the above teachings and, therefore within the scope of the appended claims the invention may be practised otherwise than as particularly described.

What is claimed:

1. In a process for alkylating an aromatic hydrocarbon by contact with an olefinic gas in an alkylation zone in the presence of a metal chloride alkylation catalyst wherein a gaseous effluent, containing hydrogen chlordie, and a liquid effluent containing alkylated aromatic hydrocarbon, unreacted aromatic hydrocarbon and dissolved hydrogen chloride are withdrawn from the alkylation reaction zone, the improvement comprising:

a. flashing the liquid effluent to reduce the hydrogen chloride content thereof and produce a flash gas, containing hydrogen chloride, alkylated aromatic hydrocarbon and unreacted aromatic hydrocarbon;

b. cooling the flash gas to condense alkylated aromatic hydrocarbon and a major portion of the aromatic hydrocarbon and produce a remaining flash gas;

c. directly contacting the remaining flash gas and the gaseous effluent from the alkylation zone with aromatic hydrocarbon to be used as fresh feed to the alkylation zone to absorb hydrogen chloride; and d. introducing into the alkylation zone aromatic hydrocarbon containing hydrogen chloride absorbed from the gaseous effluent and the remaining flash gas.

2. The process of claim 1 wherein the flash gas and gaseous effluent are directly contacted with aromatic hydrocarbon in separate absorption zones.

3. The process of claim 1 wherein the flashing step (a) is effected at a temperature of from 120° to 170°C at a pressure from 10 psig to 50 psig.

4. The process of claim 3 wherein the flash gas is cooled in step (b) to a temperature of from 107° to 135°C.

5. The process of claim 1 wherein the aromatic hydrocarbon is benzene and the olefinic gas is ethylene.

6. The process of claim 5 wherein the gaseous effluent is contacted with aromatic hydrocarbon in a first absorption zone operated at a temperature of from 20° to 150°C and a pressure of from 5 to 150 psig, and the remaining flash gas is contacted with aromatic hydrocarbon in a second absorption zone operated at a temperature of from 20° to 150°C and a pressure of from 5 to 150 psig.

* * * * *